J. A. WHITNEY.
Apparatus for Transporting Milk.
No. 134,020. Patented Dec. 17, 1872.
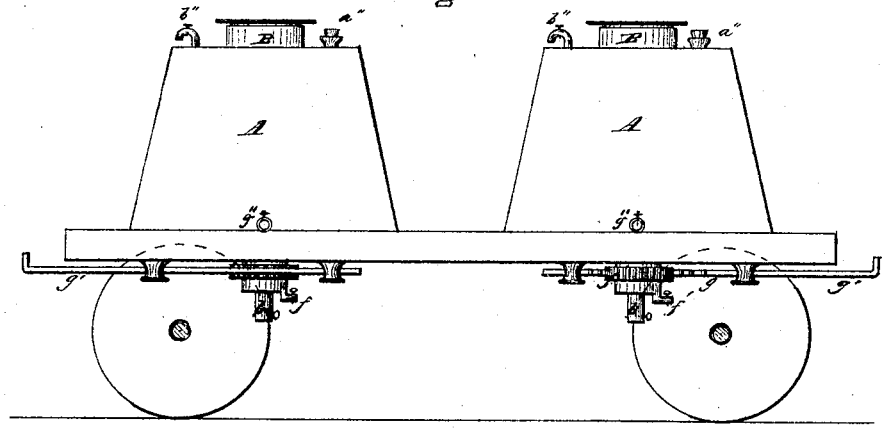
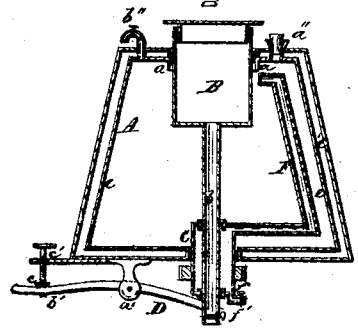 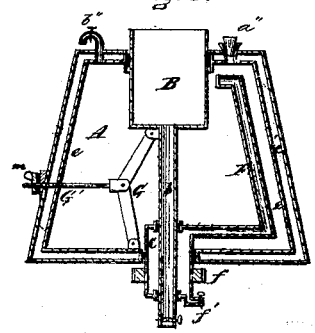
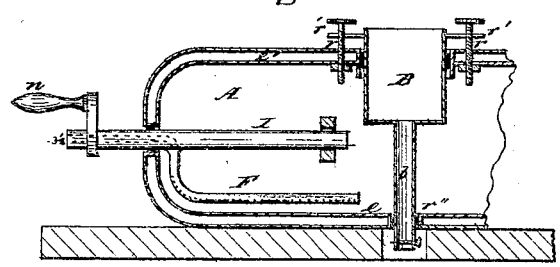

UNITED STATES PATENT OFFICE.

JAMES A. WHITNEY, OF BROOKLYN, ASSIGNOR TO MELVILLE E. DAYTON, OF SYRACUSE, NEW YORK.

IMPROVEMENT IN APPARATUS FOR TRANSPORTING MILK.

Specification forming part of Letters Patent No. 134,020, dated December 17, 1872.

*To all whom it may concern:*

Be it known that I, JAMES A. WHITNEY, of Brooklyn, in the county of Kings and State of New York, have invented certain Improvements in Apparatus for Transporting Milk, of which the following is a specification:

This invention consists in a novel apparatus for transporting milk in bulk, more especially upon railways, whereby during such transport the milk is prevented from being agitated or "churned" by the motion to which the containing tank is necessarily subjected; whereby it is kept cool to avoid fermentation or change; and whereby due provision is made for the thorough and convenient internal cleansing of the aforesaid tank when desired.

Figure 1 is a side elevation of the apparatus placed upon a platform-car for use. Fig. 2 is a vertical transverse sectional view, showing the internal parts of the apparatus. Fig. 3 is a view corresponding to Fig. 2, but showing a modification of the invention. Fig. 4 is a similar view, showing another modification.

A is a tank, made preferably of boiler-plate iron, and either upright in slightly conical form, as represented in Figs. 1, 2, and 3; in the form of a horizontal cylinder, as shown in Fig. 4; or in any other that may be preferred. In the top of this tank, and preferably of circular shape, is an opening, at the edges of which is provided a flange, $a$, serving as a guide for a vessel, B, capable of moving up and down through the opening, and furnished with a pipe, $b$, which, as shown in Figs. 2 and 3, passes through a stuffing-box in the socket C in the bottom of the tank, the office of which is presently hereinafter set forth. Upon the lower extremity of the pipe $b$ are lateral projections which pass into slots in the end of a lever, D, which is pivoted at $a$, and the outer end of which passes through a collar, $b'$, into which is swiveled the lower extremity of a screw, $c$, the latter working through a fixed bearing at $c'$. By turning the screw in one direction or the other the lever will be made to raise or lower the vessel B, thereby increasing or diminishing, as the case may be, the available capacity of the tank. This result would of course be the same if the vessel B were substituted by a solid body of like size and shape, as an equivalent therefor, for the function just set forth. The tanks, as indicated in Fig. 1, may be attached either singly or by twos or threes upon platform-cars.

The milk, by preference previously cooled below its normal temperature, is passed into the tank through a funnel, $a''$, in the top, there being also in the said top a small cock, $b''$, to permit the exit of air during the operation of filling. When the tank has been brought as nearly full as may be the funnel $a''$ is closed by a screw-plug, and the cock $b''$ is in due time also turned to a closed position. The screw C is turned to bring the vessel B downward with a force sufficient to diminish the capacity of the tank until the contents of such tank are compressed into all parts thereof, no space being left for the agitation of the milk or its churning or movement from side to side with reference to the tank, which movement, if suffered to occur, as in an ordinary or partially-filled tank, would materially injure the quality of the milk. Furthermore, the air being by this means wholly expelled from the tank any injurious action thereof upon the milk is avoided. The vessel B is filled with ice, which, by the abstraction of heat from the milk around and below the vessel, serves to maintain the milk at the low temperature requisite to the prevention of the spoiling of the milk during transit in warm weather. The colder portion of the milk in contact with the vessel passing downward, by its greater specific gravity, is replaced by that from more distant parts of the tank, so that this arrangement of the ice vessel with the milk about and below it insures a circulation of the milk within the tank and in contact with the cooling surface, whereby the entire mass is practically cooled with a close approach to uniformity. The water resulting from the gradual cooling of the ice, which, if suffered to accumulate, would impair the refrigerating action of the ice, is allowed to drain away through the pipe $b$. This pipe is provided at its lower end with an outlet-cock for controlling the outflow of the water aforesaid.

In order to prevent the milk from becoming warm by heat communicated from external sources, and also to provide a surface in contact therewith not liable to corrosion, and which will be capable of being easily cleansed, the tank is provided with an inner annular partition, e, of sheet-tin, between which and the boiler-plate, of which the tank itself is made, is interposed a layer, e', of felt or equivalent non-conductor of heat.

The socket C works through a stuffing-box of any suitable construction, arranged, when the tank is of the form shown in Figs. 1, 2, and 3, centrally in the bottom thereof. Upon its lower portion is formed a spur-wheel, f, below which is a nozzle, f', for the attachment of a hose. This nozzle connects, by a passage through the socket, with a pipe, F, attached to the socket and conforming in its shape to the contour of the bottom, side, and top of one lateral half of the tank, as represented in Figs. 2 and 3. The outermost side of this pipe, from the one of its ends to the other, is perforated with numerous holes.

The tank being empty, and it being desired to cleanse the interior thereof, a hose leading from a steam-boiler is attached to the nozzle f', and a movement about the axial line of the socket is given to the pipe F, whereupon the steam, issuing through the holes in the pipe F, coming in contact with the inner surface of the tank, effectually cleanses the same, the traversing movement of the pipe insuring the impact of the steam upon all portions of the said surface. To provide for the aforesaid movement of the pipe F a rack, g, provided with a bar, g', sliding horizontally below the bottom of the tank, is geared with the spur-wheel f in such manner that a reciprocating movement of the bar will rotate the spur-wheel alternately in opposite directions to operate the pipe F, as aforesaid. The water from the condensation of the steam may be withdrawn by the cock g'' provided at the bottom of the tank, and used, also, for the outlet of the milk in emptying the same.

In the modification shown in Fig. 3 the vessel B is moved up and down by a toggle-joint, G, worked by a nut, m, upon a threaded rod, G', passing through a stuffing-box in the side of the tank and connected at its inner end with the central joint of the toggle.

In the modification shown in Fig. 4 the tank is cylindrical, and the pipe F is carried by a horizontal axial shaft, I, the end of which extends through a stuffing-box in the end of the tank, and is furnished with a crank, n, by which the pipe F is rotated to sweep the steam-jets against the entire circumferential surface of the adjacent portion of the tank, the steam being admitted to the pipe through a passage, n', in the outermost end of the shaft I. In the said Fig. 4, furthermore, the vessel B is raised and lowered by screws r passing through lateral lugs r' provided upon the top of the vessel, the screws working into nuts fixed upon the top of the tank. In this case the outflow-pipe b may pass at its lower end through a simple stuffing-box at r''.

The flange should be fitted with suitable packing bearing against the outer surface of the vessel B in such manner as to provide a perfectly tight joint around the same.

What I claim as my invention is—

1. In a milk-transporting apparatus, the device B, arranged to vary the available capacity of the tank, substantially as and for the purpose specified.

2. In a milk-transporting apparatus, the device B, constructed to serve also as an ice-receiver, substantially as and for the purpose specified.

3. The combination of the pipe b with the vertically-movable ice-receiver and the tank A, substantially as and for the purpose specified.

4. The perforated steam-pipe F arranged within the tank and capable of a movement with reference to the inner surface of the same, substantially as and for the purpose specified, 5. The arrangement of the ice-receiver in the top of the tank in such manner that the milk to be kept at a low temperature shall be about and below the same, substantially as and for the purpose specified.

JAMES A. WHITNEY.

Witnesses:
GEORGE J. BARNY,
GEORGE J. WARNER.